(12) United States Patent
Alfred

(10) Patent No.: US 10,377,470 B2
(45) Date of Patent: Aug. 13, 2019

(54) ROTORCRAFT WITH REDUNDANT PROCESSORS USING STATE COMPARISON

(71) Applicant: Bell Helicopter Textron Inc., Fort Worth, TX (US)

(72) Inventor: Jillian Samantha Alfred, Ft. Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 199 days.

(21) Appl. No.: 15/646,894

(22) Filed: Jul. 11, 2017

(65) Prior Publication Data

US 2019/0016443 A1 Jan. 17, 2019

(51) Int. Cl.
*B64C 13/50* (2006.01)
*G05D 1/10* (2006.01)
*G05D 1/00* (2006.01)

(52) U.S. Cl.
CPC ......... *B64C 13/503* (2013.01); *G05D 1/0077* (2013.01); *G05D 1/101* (2013.01)

(58) Field of Classification Search
CPC ..... B64C 13/503; G05D 1/0077; G05D 1/101
USPC .......................................................... 701/4
See application file for complete search history.

(56) References Cited

U.S. PATENT DOCUMENTS

| | | | |
|---|---|---|---|
| 9,399,511 B2 | 7/2016 | Kim et al. | |
| 2007/0032923 A1* | 2/2007 | Mossman | G05D 1/0858 701/4 |
| 2012/0253558 A1 | 10/2012 | Christensen et al. | |
| 2013/0138270 A1* | 5/2013 | Christensen | G05D 1/102 701/3 |
| 2013/0274963 A1 | 10/2013 | Shue et al. | |
| 2014/0363288 A1 | 12/2014 | Schaeffer et al. | |
| 2015/0232176 A1 | 8/2015 | Gillet et al. | |
| 2017/0210466 A1* | 7/2017 | Cherepinsky | G05D 1/0669 |
| 2017/0358219 A1* | 12/2017 | Garai | B64D 43/02 |
| 2018/0215460 A1* | 8/2018 | Worsham | B64C 13/503 |
| 2018/0244369 A1* | 8/2018 | Alfred | B64C 13/18 |
| 2018/0275684 A1* | 9/2018 | Gillett | B64C 13/503 |

(Continued)

FOREIGN PATENT DOCUMENTS

| | | |
|---|---|---|
| EP | 0186965 A1 | 7/1986 |
| EP | 2947531 A1 | 11/2015 |
| WO | 2015025262 A1 | 2/2015 |

*Primary Examiner* — Thomas G Black
*Assistant Examiner* — Wae L Louie
(74) *Attorney, Agent, or Firm* — Slater Matsil, LLP

(57) ABSTRACT

A system and method for providing state comparison of redundant processors used, e.g. to control a rotor craft. A primary microprocessor is configured to receive input data from a position sensor and a flight condition sensor and determine therefrom a first desired control law state, and a secondary microprocessor is configured to receive input data from the position sensor and the flight condition sensor and determine therefrom a second desired control law state. The first desired control law state from the primary microprocessor and the second desired control law state from the secondary microprocessor are compared, and (a) the first desired control law state is entered when the first desired control law state and the second desired control law state match, and (b) a last known control law state is maintained when the first desired control law state and the second desired control law state do not match.

24 Claims, 5 Drawing Sheets

(56) References Cited

U.S. PATENT DOCUMENTS

2018/0290733 A1\* 10/2018 Worsham, II ........... B64C 27/06
2019/0016443 A1\* 1/2019 Alfred ................... B64C 13/503

\* cited by examiner

US 10,377,470 B2

ROTORCRAFT WITH REDUNDANT PROCESSORS USING STATE COMPARISON

TECHNICAL FIELD

The present invention relates generally to a system and method for automated flight control in a rotorcraft, and more particularly, to a rotorcraft having redundant control processors employing state comparison between the processors for key control operations.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload. Modern control systems include one or more flight control computers that can be intimately involved in mission-critical flight control and stability functions. Hence, a high degree of reliability is an essential parameter for the flight control computers.

SUMMARY

Embodiments disclosed herein may provide for a rotorcraft comprising a rotor, a pilot input device, a position sensor coupled to the input device, a flight condition sensor, and a flight control computer (FCC). The FCC may include a primary microprocessor configured to receive input data from the position sensor and the flight condition sensor and determine therefrom a first desired control law state, and a secondary microprocessor configured to receive input data from the position sensor and the flight condition sensor and determine therefrom a second desired control law state. The FCC may be configured to compare the first desired control law state from the primary microprocessor and the second desired control law state from the secondary microprocessor and to (a) enter the first desired control law state when the first desired control law state and the second desired control law state match, and (b) maintain a last known control law state when the first desired control law state and the second desired control law state do not match.

In some embodiments, the rotorcraft may be flown by sensing a pilot input condition, sensing a flight condition of the rotorcraft, and inputting the pilot input condition and the flight condition to a first hardware/software combination and inputting the pilot input condition and the flight condition to a second hardware/software combination. The method may further include determining, using the first hardware/software combination, a first control law state based on the pilot input condition and the flight condition, and determining, using the second hardware/software combination, a second control law state. The method may further include comparing the first control law state and the second control law state, and adopting the first control law state, in response to determining that the first control law state and the second control law state match, maintaining the first control law state, in response to determining that the first control law state and the second control law state match, when the first control law state is the same as an immediately previously adopted control law state, and maintaining a previous control law state and maintaining a current flight trim condition in response to determining the first control law state and the second control law state do not match.

In another aspect, the embodiments disclosed herein may provide for a computer architecture for controlling a system, the computer architecture, including a first processing lane, the first processing lane including a first microprocessor and a second microprocessor. The first microprocessor and the second microprocessor have at least one material difference, which at least one material difference may cause, in the absence of an error, a different output from the second microprocessor relative to the output from the first microprocessor when the second microprocessor and the first microprocessor receive identical input data and run identical program steps on the identical input data. The computer architecture may further include input ports configured to receive input data indicative of a condition of the system, and second processing lane, the second processing lane including a third microprocessor and a fourth microprocessor, wherein the third microprocessor and the fourth microprocessor are similar in all material respects, such that, absent an error, the fourth microprocessor and the third microprocessor will output a same result when the fourth microprocessor and the third microprocessor receive identical input data and run identical program steps on the identical data. The computer architecture may further include a comparator configured to compare an output from the first microprocessor and the second microprocessor, and a state selector configured to select or maintain a state represented by the output from the first microprocessor when the output from the first microprocessor and the second microprocessor match and to maintain a current state when the output from the first microprocessor and the second microprocessor do not match.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
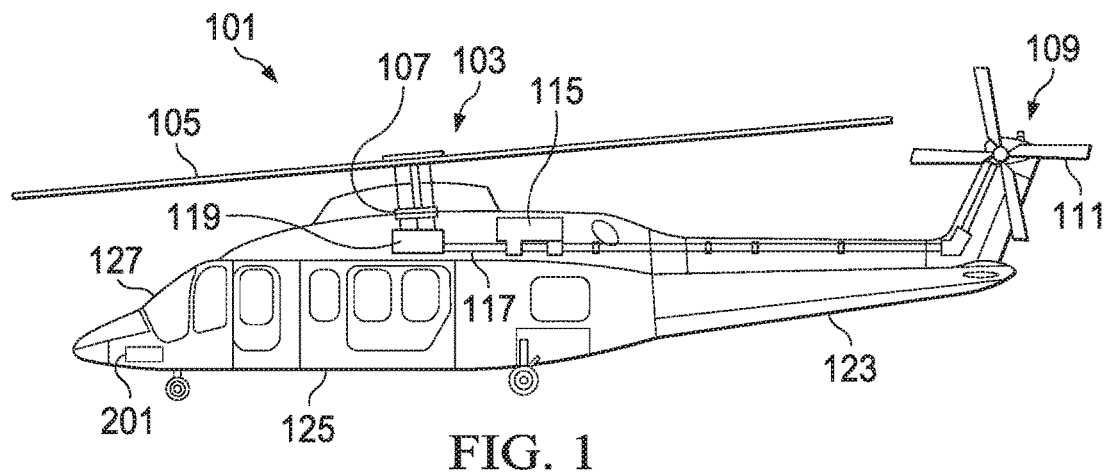
FIG. 1 illustrates a rotorcraft.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission 121, respectively.

The rotorcraft 101 further includes a fuselage 125 and tail section 123. The tail section 123 may have other flight control devices such as horizontal or vertical stabilizers, rudders, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case cockpit 127 could be eliminated entirely in order to save space and cost.

Figure 2:
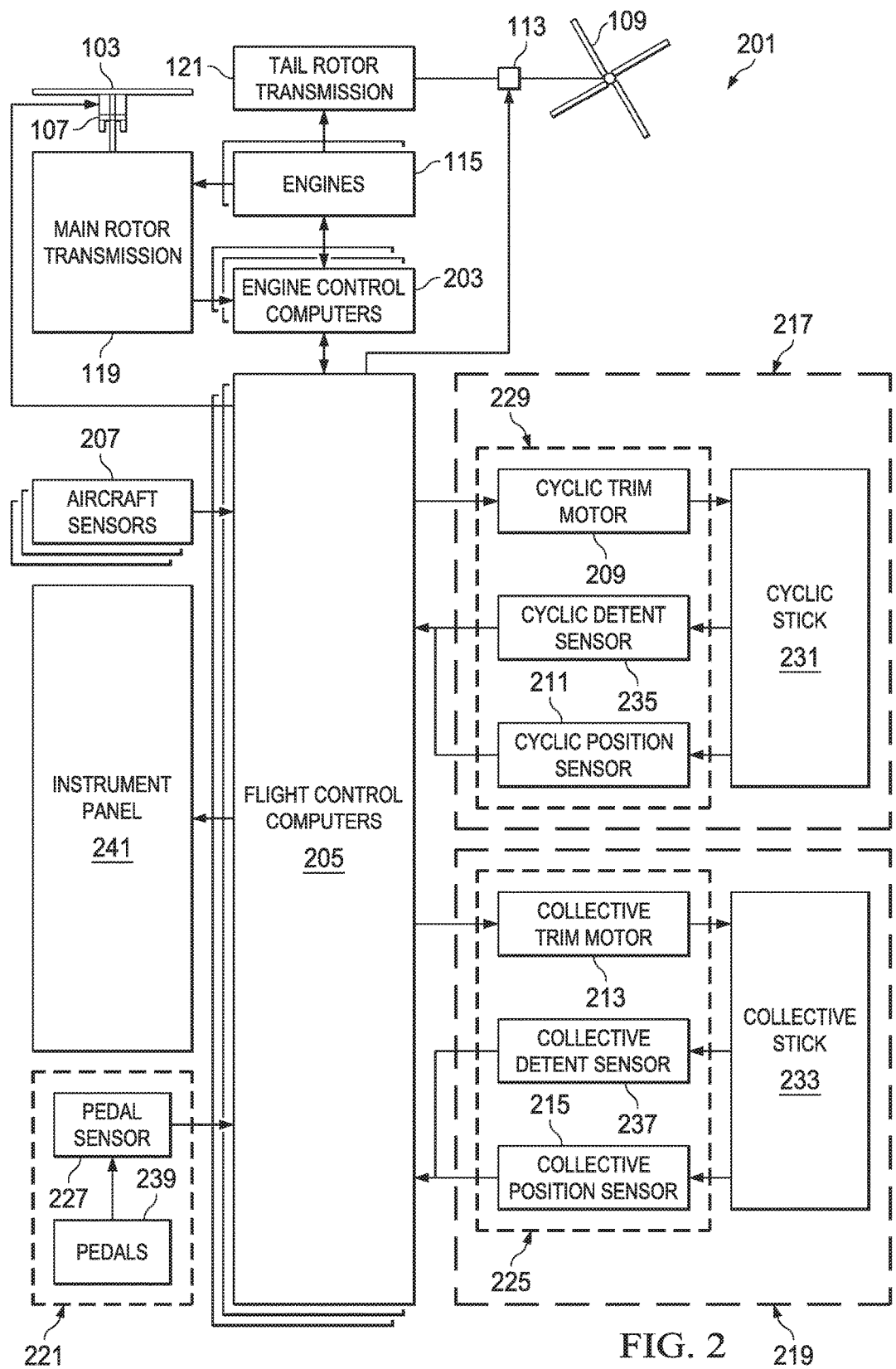
FIG. 2 illustrates a fly-by-wire flight control system for a rotorcraft.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured RPM of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measure roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 209 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. These detent sensors 235, 237 detect motion and/or position of the respective control stick that is caused by pilot input, as opposed to motion and/or position caused by commands from the FCCs 205, rotorcraft vibration, and the like, and provide feedback signals indicative of such to the FCCs 205. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
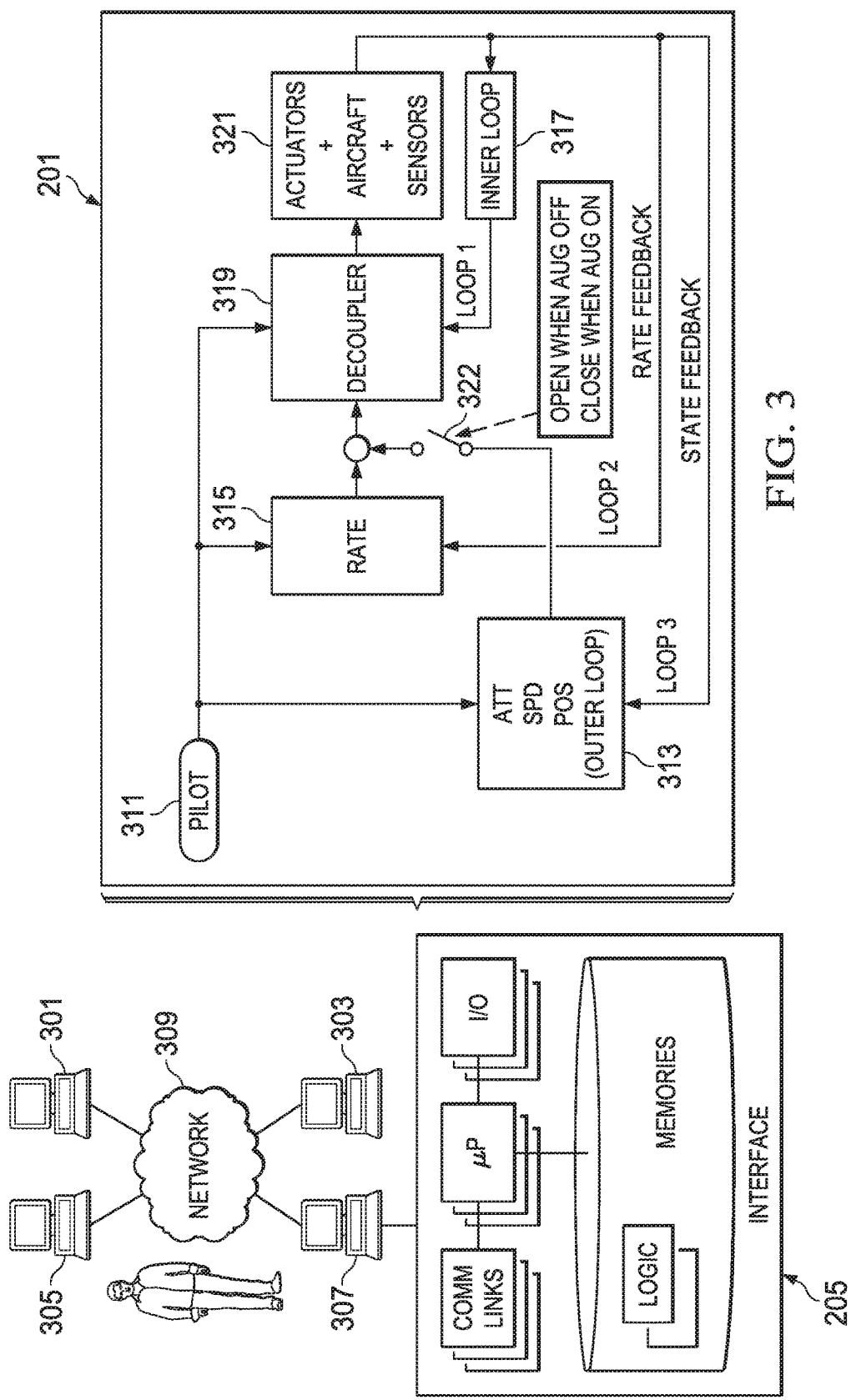
FIG. 3 schematically illustrates a manner in which a flight control system may implement fly-by-wire functions as a series of inter-related feedback loops running control laws.

Moving now to the operational aspects of flight control system 201, FIG. 3 illustrates in a highly schematic fashion, a manner in which flight control system 201 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 121, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, as the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

Figure 4:
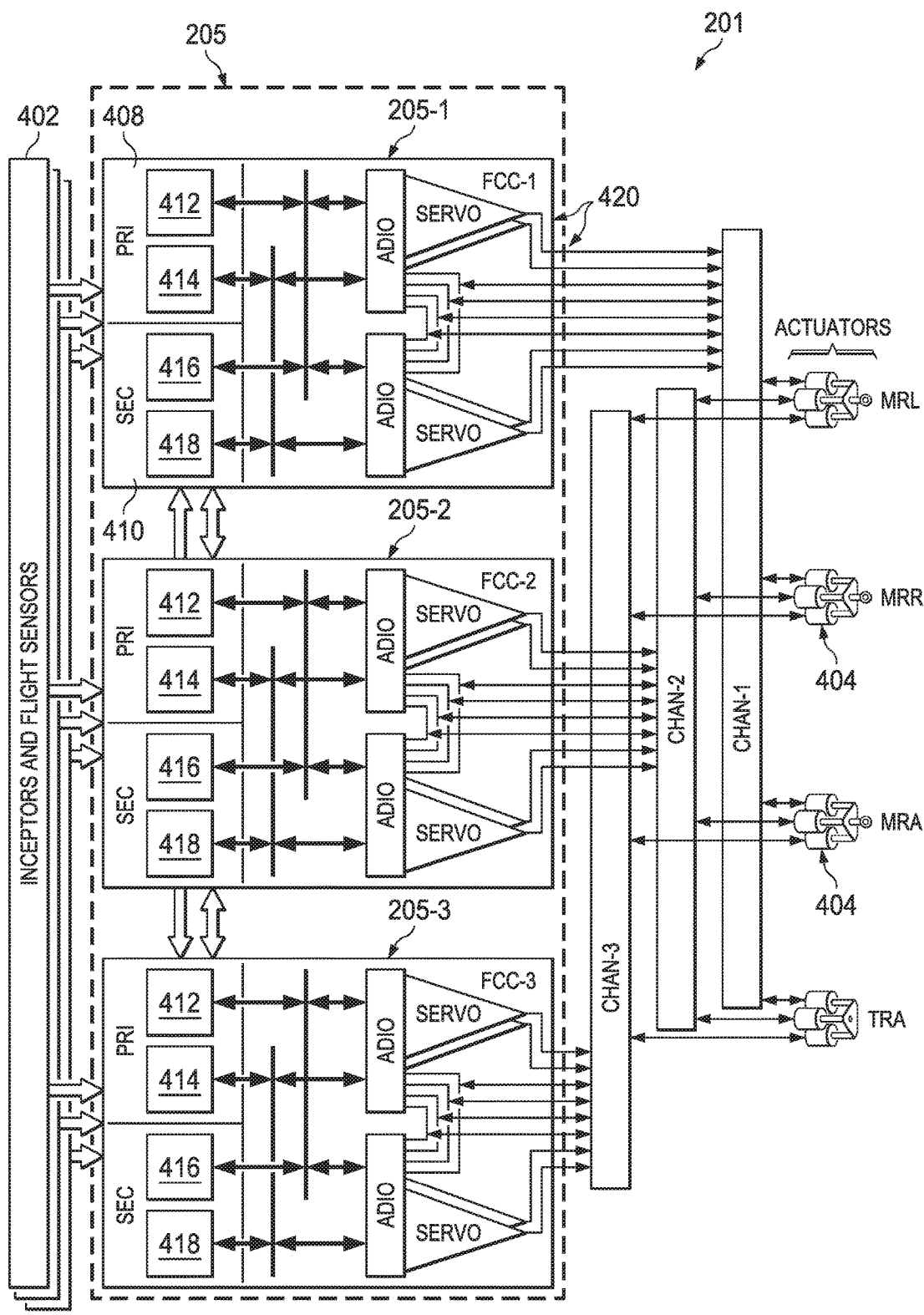
FIG. 4 illustrates an illustrative flight control system.

FIG. 4 illustrates flight control system 201 at a different level of abstraction. At its simplest, flight control system 201 can be considered to consist of a series of input device 402 feeding FCCs 205, which in some embodiments can be thought of as a series of state machines running the control laws that control flight operations and which, in turn, drive actuators 404 to control various flight control device of hovercraft 101. Sensors 402 can include a variety of different sensors. Sensors for sensing pilot commands can include (with reference to FIG. 2) cyclic position sensor 211, collective position sensor 215, pedal sensors 227 as well as sensors for detecting other pilot input including activation of a beep switch, activation of some other switch, touch on a touch sensitive contact surface, selection of a command menu item on a user interface, and the like. Sensors 402 can also include sensors 207 discussed above. While FIG. 4 schematically illustrates output from sensors 402 being fed directly to FCCs 205, one skilled in the art will recognize that in some embodiments, signal processing or logic circuitry may be interjacent sensors 402 and FCCs 205, e.g. to convert the output of sensors 402 from an analog format to a digital format or to otherwise translate the format of data output by sensors 402 into a data format expected by FCCs 205.

Actuators 404 may be hydraulic actuators, pneumatic actuators, mechanical actuators that include a driveshaft driven by a step motor, or the like. In the presently contemplated embodiments, actuators 404 include feedback elements, such as a position sensor, a hard stop position indicator, or the like (not illustrated as such elements are not necessary for an understanding of the illustrated embodiments), which in turn are another category of sensors 402. Flight control devices 406 may include swash plate 107, for adjusting the pitch of main rotor blades 105, a gear box for adjusting the pitch of tail rotor blades 111, a rudder, and the like.

Because flight control system 201 is responsible for numerous "mission critical" functions to maintain safe and expected control of hovercraft 101, it is imperative that flight control system 201 has a high degree of reliability. Some governmental agencies impose reliability standards for mission critical type functions and systems such as flight control system 201, and in particular the FCCs 205 upon which key components of the flight control system are implemented in the embodiments described herein. For instance, under guidelines of the United States' Federal Aviation Authority (FAA), certification of a rotorcraft requires establishing that the chances of a catastrophic failure are less than $10^{-9}$ or stated another way less than one in ten billion In order to ensure such a high degree of reliability, several levels of redundancy and self-checking are built into the illustrative flight control system 201 and FCCs 205 described herein. As shown in FIG. 4, FCCs 205 may be implemented as several redundant FCCs, 205-1, 205-2 and 205-3. In the illustrated embodiments, each of the redundant FCCs is a mirror copy of the others and is nominally fully functioning at all times. Whereas three redundant FCCs are illustrated, as a matter of design choice two or more than three redundant FCCs could be used. Additionally, while 100% redundancy between the redundant FCCs is illustrated, in some embodiments, only a portion or portions of the FCC is replicated in a redundant portion or portions.

Operational tasks can be apportioned amongst the redundant FCCs in various ways. For example, in one embodiment, FCC 205-1 is the primary FCC and is responsible for all tasks, while FCCs 205-2 and 205-3 are merely back-up systems in the event that FCC 205-1 fails or is otherwise unable to perform operational tasks. In another embodiment, however, operational tasks are shared equally among each of the redundant FCCs 205-1, 205-2 and 205-3. In this way, the overall work load can be apportioned amongst the multiple computers, allowing each of the redundant computers to operate more efficiently and with little or no change of a single redundant FCC being overloaded in a scenario requiring inordinate tasks or processing.

Another level of redundancy is illustrated in FIG. 4, with each redundant FCC having a first processing lane 408, sometimes referred to as a primary processing lane and a redundant processing lane 410, sometimes referred to as a secondary processing lane. In some embodiments, primary processing lane 408 and secondary processing lane 410 are mirror images of each other. In the illustrated embodiment, however, primary processing lane 408 and secondary processing lane 410 differ, as will be discussed in more detail below.

Figure 5:
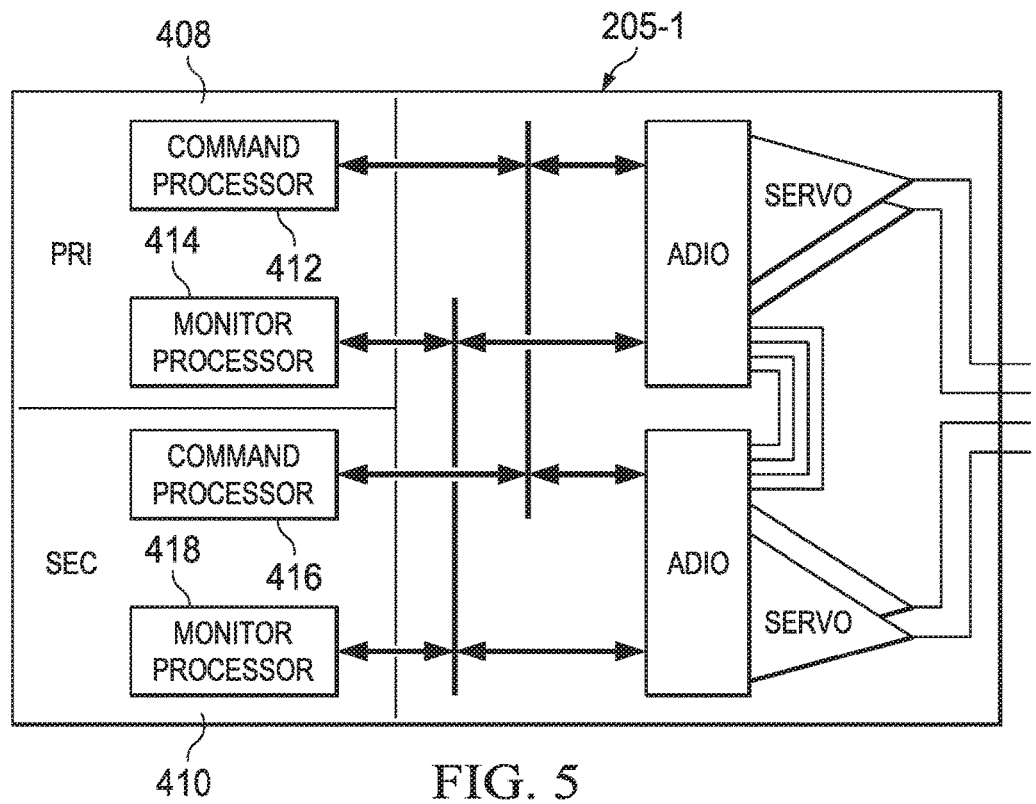
FIG. 5 illustrates certain aspects of an illustrative an illustrative flight control computer.

One way in which primary processing lane 408 and secondary processing lane 410 do not differ is that each processing lane includes yet another level of redundancy. Reference is made to FIG. 5, which illustrates FCC 205-1 in greater detail. The following discussion applies equally to FCCs 205-2 and 205-3. As shown in FIG. 5, each processing lane 408, 410 has two separate processors operating in the lane. Processing lane 408 includes a first processor 412, sometimes referred to as a command processor, and a second processor 414, sometimes referred to as a monitor processor, for reasons that will be apparent in the following discussion. Likewise, processing lane 410 has a first or command processor 416 and a second or monitor processor 418.

The term processor can have different meanings in different contexts, including within the confines of this disclosure. Without limiting the generality of the term processor, in the specific context of the illustration of FIG. 5, processor refers to a microprocessor unit (typically but not mandatorily formed as a single-chip or multi-chip integrated circuit product) that, along with associated support logic, memory devices, etc., run preprogrammed instruction to perform desired operations of FCC 205. Each processor 412, 414, 416, 418 could be a general purpose microprocessor or microcontroller. In other embodiments, each processor 412, 414, 416, 418 could be a special purpose processor, such as a digital signal processor.

In currently contemplated embodiments, processor 412 and processor 414 differ in a material way. Even though processor 412 and processor 414 are redundant processors, they are not identical processors. In order to increase the reliability of FCC 205, different processors are chosen for processing lane 408. In this way, an error (whether of design, or manufacture, or programming, etc.) that negatively impacts the reliability and/or performance of processor 412 is highly unlikely to also exist in a different processor 414. In other words, if both processor 412 and processor 414 are the same product model, an inherent (albeit undetected) design or programming flaw in processor 412 will likewise also exist in processor 414—meaning that if one processor fails under a certain set of conditions, the redundant processor will likewise fail under those conditions, thus rendering the redundancy ineffective. Similarly, if processor 412 and 414 are obtained from the same source, a latent manufacturing defect in one processor is likely to exist in the other processor, again rendering the redundancy ineffective. In order to minimize the risk of such circumstances occurring processing lane 408 is designed to have a first processor that is different in at least one material respect from its second, redundant processor. For instance, in one example, command processor 412 is a 32-bit floating point digital signal processor, such as a TSM320 series DSP available from Texas Instruments, Inc. of Dallas, Tex., and monitor processor 414 is a different 32-bit floating point processor, such as a Share DSP available from Analog Devices, Inc. of Norwood, Mass. In this embodiment, processors 412 and 414 are similar enough to be compatible, but are obtained from different sources (manufacturers) and hence have different designs and architecture implementation details. In other embodiments, the processors could differ in other material ways, such as different product families from the same manufacturer, or processors having different but compatible architectures, whether from the same or different sources. In yet other embodiments, the processors could have similar hardware components, but have significantly different software components, such as the compilers by which the respective processors decode instructions. One skilled in the art will recognize other respects in which the redundant processors can differ, while still being compatible, in such a way to avoid duplication of inherent defects, such as design, programming, or manufacturing flaws.

In some embodiments, redundant processing lane 410 could also include redundant processors 416, 418 that differ in a material aspect. In the illustrated embodiment, however, redundant processing lane 410 is designed with two processors 416, 418 that are "identical," meaning for the purpose of this discussion that, in the absence of an error or defect, the same result will always be output from the first processor and the second microprocessor when the first processor and the second processor receive identical input data and run identical program steps on the identical input data. Although processors 416, 418 might be identical to one another, to avoid the duplication of defect concerns discussed above, in a preferred embodiment, processors 416 and 418 differ in a material respect from one or both of processors 412 and 414. For instance, processors 416 and 418 could be 32-bit floating point DSPs obtained from a different source, such as from Motorola, Inc. of Schaumburg, Ill.

One skilled in the art will recognize improved system reliability is provided by implementation of redundant processing lanes 408 and 410, each of which including a redundant processors 412, 414 and 416, 418, respectively. For instance, in one contemplated embodiment, processing lane 408 is considered the primary processing lane and handles the computational functions of FCC 205. In the event that processing lane 408 fails—which is unlikely given that processing lane 408 itself has redundant processors—computation functions can be routed to secondary processing lane 410 without any loss of performance or functionality. Similarly, a switch-over can be implement if processors 412 and 414, for instance, differ from one another by above a certain threshold, as discussed further below. FIG. 4 also illustrates redundant busses and I/O circuitry 420 by which control signals generated by the processing lanes can be communicated, e.g., to actuators 404.

Returning attention now to processing lane 408, even though processor 412 is designated as a primary processor and processor 414 is designated as a monitor processor, in the design of the illustrated system, both processor 412 and processor 414 are fully functioning at all times. In other words, processor 412 and processor 414 are on "parallel paths" in the flow of data and commands within FCCs 205. As a result of this configuration, a surprising and unintended consequence of using different processors 412, 414 has been identified. As stated previously, both processor 412 and processor 414 receive identical input data (e.g., from sensors 402) and run identical programs (e.g., the control laws by which fly-by-wire control signals are generated). Under these circumstances, one would expect identical results to be output from two processors running identical programs using identical input data, and under most circumstances, this is the case. Because processors 412 and 414 differ in at least one material respect, however, there are circumstances (rare, but statistically significant) under which the processors will output different results even when running the same programs on the same input data. As an example, pilot inputs, such as movement of the collective, the cyclic, etc., must be measured with a high degree of accuracy in order to ensure that the fly-by-wire system is highly responsive to pilot input. Similarly, flight characteristics such as attitude and changes in attitude of the three axes, the position of the various actuators 404, and the like must also be measured with a high degree of accuracy. Hence, input data from the sensors (whether received directly from the sensors or received via intervening logic that reformats or otherwise modifies the sensor data) is input to FCCs 205 and hence to processors 412, 414 with a high degree of accuracy. All or most of the computations that processors 412, 414 perform on the data is likewise performed to a high degree of accuracy, and these computations may be performed simultaneously and in real-time on numerous different input values. While at a gross level (e.g., nearest integer or tenth of integer), one would expect all commercial processors to provide the same results when operating on the same input data, at the levels of accuracy required by FCCs 205, instances arise where differences between the processors 412, 414 can cause differences in the calculation results at the Nth degree of accuracy. When this occurs, processors 412 and 414 might output different results, which is referred to herein sometimes as a processor mismatch. Conventionally, a processor mismatch would be considered an error condition.

In a previously contemplated implementation of FCCs 205, the outputs of command processor 412 and monitor processor 414 were both considered, meaning that under circumstances such as those described in the preceding paragraph, one processor might direct one action be taken while the other processor directs a different action be taken. In this event, FCCs 205 would declare primary processing lane 408 unreliable and switch processing authority over to secondary processing lane 410. While this ability to switch over to a redundant path is a keystone for reliability, switching over un-necessarily (i.e. under conditions that do not truly reflect an error in the primary path) reduces the system's overall redundancy capability.

The present inventors have recognized that mismatches (of the type described above) between processor 412 and processor 414 occur only at the "margins" of the expected computational windows of these processors and that furthermore these "marginal" conditions are likely quite transitory. In other words, these processor mismatches arise because at the Nth decimal place of processing the input values the processors perform slightly differently. Note, however, that the input values represent real-world conditions such as the position of the pilot controls, the pitch of the craft, etc., and these real-world input conditions do not remain static for long at the Nth decimal place of accuracy. Hence, the inputs values that caused the processor mismatch are likely to be transitory and the processor mismatch is likely to resolve itself in short order if the processors are allowed to continue operating. If, on the other hand, any processor mismatch is considered to be an error condition and results in a switchover to a redundant system (processing lane), than the opportunity for the transient condition to be resolved is lost. In order to improve the overall reliability and performance of FCCs 205, the presently disclosed embodiments are configured as follows. A first processor of a redundant processor pair is considered the command processor, such as processor 412. A second processor of the redundant processor pair is considered the monitor processor, such a processor 414. Both command processor 412 and secondary processor 414 receive (the same) input values and perform (the same) computations thereon to generate a desired output value or command. Assuming a typical condition, both command processor 412 and monitor processor 414 will generate the same output command. This output command will be acted upon by FCCs 205, e.g., by generating appropriate control signals to activate actuators 404 to control flight control devices 406. These output commands are generated for each time frame of FCCs 205. In a non-limiting example, the frame rate is likely many frames or hundreds of frames per second. At a next time frame, command processor 412 may output the same command value as that generated in the previous frame. If monitor processor 414 likewise outputs the same value as the command processor, this command will continue to be acted upon. On the other hand, if monitor processor 414 outputs a different value than the command processor, a processor mismatch condition has arisen. In the event of a processor mismatch condition, FCC 205 will continue to act upon the previous output command, that being the most recent output command for which both command processor 412 and monitor processor 414 agreed. FCCs 205 will continue to act upon the previous output command until the processor mismatch condition is resolved, e.g., the command processor and the monitor processor otherwise output a same command value (in which case that same command value will be acted upon).

Similarly, consider the event wherein after the steady state, command processor 412 outputs a new command value, different from the previously generated command value (i.e., due to changes in pilot input, flight conditions, etc.). If monitor processor 414 also outputs the new command value, then the new command value will be acted upon by FCCs 205. On the other hand, if monitor processor 414 continues to output the previous command value (or outputs some other command value that does not match the new command value being output by processor 412), then a processor mismatch condition has arisen. In such a case, FCCs 205 will continue to act upon the previous output command, that being the most recent output command for which both command processor 412 and monitor processor 414 agreed. The mismatch condition will continue until the processors again output the same command value, in which case that same command value will be acted upon.

In summary, it is contemplated that command processor 412 and monitor processor 414 will output the same command value under most circumstances and FCCs 205 will implement that command. In the event of a mismatch condition, FCCs 205 will not change state, but will maintain the last state for which both command processor 412 and monitor processor 414 were in agreement. This is true regardless of whether command processor 412 has a changed output value, monitor processor 414 has a changed output value, or both processors have a changed output value.

The above discussion can be put in the context of flight control system 201. As discussed above, flight control system 201 operates as a series of inter-related feedback loops running certain control laws to implement the various functions. The control laws can be implemented as state machines, wherein a state can be defined for various flight parameters and the state can change depending upon the input values from sensors 402, etc. In an embodiment, command processor 412 functions as such a state machine, receives various input values from sensors 402, etc., and outputs a state value in response thereto. Likewise monitor processor 414 also receives the input values and also outputs a state value corresponding thereto. The computed state value controls the manner in which FCCs 205 control flight control devices 406, respond to pilot input commands, etc. As an example, if input from the various sensors indicate that hovercraft 101 is on the ground (e.g., sensors on the landing gear indicate weight on all wheels), then flight control system 201 will be in a GROUND state. On the contrary, if input from the sensors indicate hovercraft 101 is in flight (e.g., sensors on the landing gear indicating in air, etc.), then flight control system will be in a different state, such as perhaps a RATE state, a HEADING state, or some other state corresponding to the flight conditions. In the GROUND state, the hovercraft responds differently to sensor feedbacks than it would in a state indicating actual flight such a RATE or HEADING.

Figure 6:
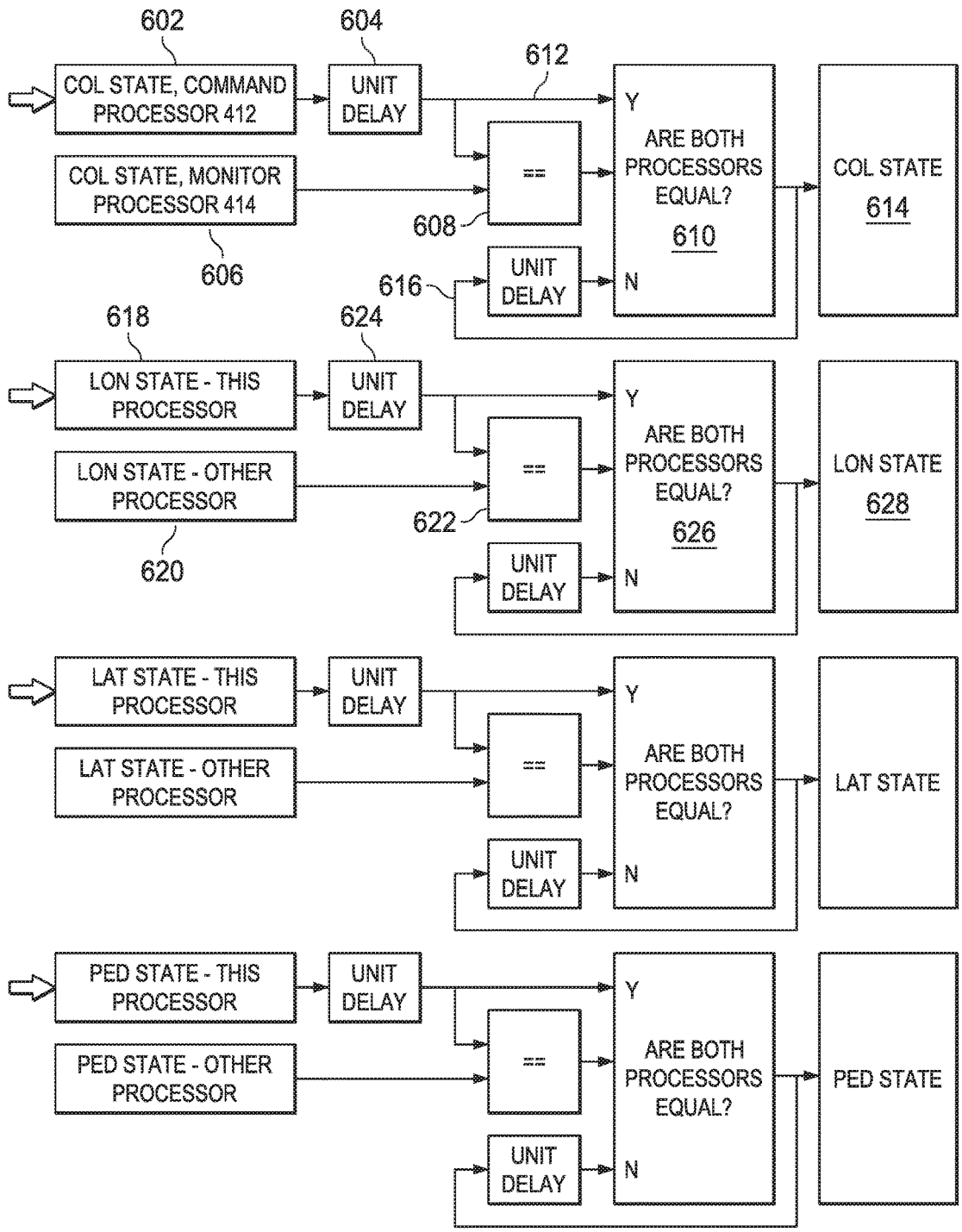
FIG. 6 illustrates an illustrative methodology for detecting and handling process mismatch in an exemplary flight control computer having redundant processing lanes.

FIG. 6 illustrates an example of the methodology for detecting and handling processor mismatch in an embodiment FCC 205-1. In this embodiment, a state is determined for each of four axes of pilot input commands and governs how each axis responds to sensor feedback and pilot inputs. These four axes are COL, which is a state based upon flight conditions and inputs from the collective assembly 219, LAT, which is a state based upon flight conditions and lateral inputs (roll) from the cyclic control assembly 217, LON, which is a state based upon flight conditions and longitudinal inputs (pitch) from the cyclic control assembly 217, and PEDAL, which is a state based upon flight conditions and inputs from the pedal assembly 221. In a first step 602, various inputs from sensors 402 and from collective assembly 219 are received at command processor 412, from which command processor 412 determines the appropriate state condition for the COL input axis. This same input information is also received at monitor processor 414 and monitor processor 414 likewise determines the appropriate state condition for the COL input axis, as shown at 606. The output command from command processor 412 is delayed by one frame as shown at 604. One skilled in the art will recognize that a frame delay can be accomplished using a hardware buffer or the like, or could be accomplished in software using memory addressing Frame delay 604 is implemented in order to synchronize the outputs from command processor 412 and monitor processor 414 for comparison, which occurs at block 608. Stated another way, the monitor processor calculates the state in one frame, which calculation is then sent to the command process in the next frame; the command processor must look back its previous frame in order to compare its calculation from the same frame as that received from the monitor processor. As an example, each processor can determine an appropriate state for the COL axis based upon the current flight conditions and the pilot input commands, as well as possibly other inputs such as commands from another control law loop (e.g., a higher level loop such as a flight director loop, auto-pilot loop, or the like). The determined state can be represented in various ways, such as an integer value corresponding to the state, a true/false value, a Boolean value, an alphanumeric string, or the like. In a currently contemplated embodiment, each relevant state has an integer value associated with it, and hence processor 412 and processor 414 each output an integer value corresponding to the state that the processors have determined to be the appropriate state for the relevant axis and control law loop.

As stated above, the state value, in this case integer value, output from command processor 412 is compared to the state value output from monitor processor 414. In the illustrated embodiment, this comparison function is performed by command processor 412. This is the reason for delay block 604, to ensure that the comparison is for the same frame for each processor. In other words, there is a one frame delay for monitor processor 414 to determine the appropriate state value and output it to command processor 412. Hence, in frame N, command processor 412 receives the state value from monitor processor 414 for frame N−1. Delay block 604 ensures that the state value output by command processor 412 at time frame N−1 is compared to the state value output by monitor processor 414 for the same time frame, in this case frame N−1. In other embodiments, the comparison function represented by block 608 could be performed in some other manner, including using special purpose logic hardware, or by some other processor of FCCs 205.

The results of comparison step 608 are evaluated, as represented by decision block 610. For instance, if it is determined that both processors are outputting the same state value, than the COL state from command processor 412 is considered valid and is acted upon, as indicated by line 612 and the state for the COL axis is updated, as indicated at block 614. Note that updated does not necessarily mean a change in the state. For instance, if both command processor 412 and monitor processor 414 agreed in the prior frame that the COL state should be GROUND and also agree in the current frame that the COL state should be GROUND, then the "updated" state for COL remains unchanged. On the other hand, if both processors agreed in the prior frame that the COL state should be GROUND, but both now agree the COL state should be a HEAVE state, then the updated COL state 614 will be HEAVE. In the event that comparison step 608 results in a processor mismatch condition then as indicated by No branch 616 of decision block 610, COL state 614 is not updated, and the system loops around to re-evaluate whether the processor mismatch condition is resolved in the next frame. Continuing with the example above, if command processor 412 and monitor processor 414 agreed in a previous frame that the COL state should be GROUND, and in the current frame one of the processors (but not both) now determines the COL state should a different state, the COL state will not be updated. This is true whether it is primary processor 412 or monitor processor 414 that outputs the new state value. Processing lane 408 will hold the current value for the COL state until either the processor mismatch is resolved by the processor falling back into synchronization or else an external processing branch (either hardware or software) determines that the processor mismatch has continued for an unacceptable period of time.

For instance, in some embodiments, a No decision in block 610 (indicating processor mismatch) might set a flag or error condition warning and also trigger a timer to start. If the processor mismatch condition has not been resolved within some acceptable period of time then a decision may be made, external to processing lane 408, that the processor mismatch condition is not a mere transitory occurrence arising from the differences between processors 412 and 414, but rather is a legitimate error condition requiring attention or remediation. Such remediation could include, among other things, switching functional operation over to secondary processing lane 410. In some instances, a threshold in the difference in the result between two processors could be the determinant for a legitimate error condition, as opposed to a transient condition. In other instances, a combination of both duration and difference threshold could be employed.

In another embodiment, entrance into path 616 (indicating a No decision in block 610) could cause a counter to increment (or decrement) and to continue to increment (or decrement) each time processing loops back through path 616. Once the counter has incremented (or decremented) to either a defined value (or zero) this would indicate that the processor mismatch is a legitimate error condition requiring attention or remediation. One skilled in the art will recognize other manners in which processing during a processor mismatch condition could be monitored.

In some embodiments, other actions might be taken in response to a processor mismatch condition being detected at block 610. For instance, some flight control systems might have a default state that is at least temporarily entered when a processor mismatch is detected. For example, every input axis has an AUG OFF state in which most high level (e.g., outer loop) control law functions are suspended. Flight control system 201 could, in some embodiments, set the appropriate axis into an AUG OFF state (or some other state) when detecting a processor mismatch, although care should be taken to ensure that such a method does not increase pilot workload or the likelihood of a negative impact on the system performance resulting from unexpected entry into an AUG OFF or other state. In other embodiments, detection of a processor mismatch could result in a signal being sent, e.g., to a pilot, or to some monitoring process that tracks statistical information such as frequency of processor mismatches, duration of such processor mismatches, trends in state transitions that are more likely to cause mismatch, etc. The results of the monitor process could be used to more effectively evaluate and respond to future processor mismatch conditions or to more quickly differentiate between a transitory (non-problematic) processor mismatch and a genuine error condition.

FIG. 6 also shows a similar methodology is employed when determining a state for each of the other input axes. As an example, FCCs 205 receive various inputs relating to flight conditions as well as the longitudinal position of cyclic stick 231 from cyclic control assembly 217, in order to determine the appropriate state condition for the LON input axis. As shown at 618, command processor 412 receives the various input information and from that computes an appropriate state condition value. This same information is likewise received by monitor processor 414 and as shown at 620 monitor processor 414 also computes an appropriate state for the LON axis. The state values output by command processor 412 and monitor processor 414 are compared, block 622, using a frame delay 624 to synchronize the outputs from the two processors. Similarly to the COL state analysis, a decision block 626 determines for the LON state whether to update the LON state 628 if the two processors agree or whether to maintain the current LON state if the two processors disagree. Likewise, a similar methodology is employed for the LAT state and for the PED state, as also shown in FIG. 6.

While the illustrated embodiment shows a microprocessor mismatch methodology for two processors determining a state condition relating to four axes of pilot input commands, one skilled in the art will recognize the same methodology could be employed in numerous other contexts whenever redundant processors are employed in a manner that their respective outputs can differ for reasons that are not related to actual errors in processing—such as when the processors' outputs differ in a transitory manner arising from rounding errors that are quickly resolved or the like. One example would be calculation of stick detents (i.e., whether a pilot is exerting control over the craft through, e.g., the cyclic and/or collective) based upon calculations applied to stick sensor data. The above-described processes are not limited to these examples, however.

The processes for the four input axes are illustrated as separate "paths" in FIG. 6. This is for simplicity of illustration only. In actual implementations, these various processes will be performed more or less simultaneously with an updated state value being computed in each frame for each of the four input axes.

An advantageous feature of the methodologies described herein is that transitory processor mismatches that occur only at the margins of computations and that are not indicative of a true error condition can be accepted without impacting system performance or reliability and without causing un-necessary switchovers to redundant processing lanes. The result is improved reliability and robustness of the system.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft comprising:
a rotor;
a pilot input device;
a position sensor coupled to the pilot input device;
a flight condition sensor; and
a FCC including:
   a primary microprocessor configured to receive input data from the position sensor and the flight condition sensor and determine therefrom a first desired control law state; and
   a secondary microprocessor configured to receive input data from the position sensor and the flight condition sensor and determine therefrom a second desired control law state;
wherein the FCC is configured to compare the first desired control law state from the primary microprocessor and the second desired control law state from the secondary microprocessor and to (a) enter the first desired control law state when the first desired control law state and the second desired control law state match, and (b) maintain a last known control law state when the first desired control law state and the second desired control law state do not match.

2. The rotorcraft of claim 1, wherein the primary microprocessor is configured to perform the comparison of the first desired control law and the second desired control law.

3. The rotorcraft of claim 1, wherein the primary microprocessor runs a first compiler and the secondary microprocessor runs a second compiler different from the first compiler.

4. The rotorcraft of claim 1, wherein the position sensor includes a first sensor configured to detect a position of a collective lever, a second and third sensor configured to detect a position in a first axis and second axis, respectively, of a cyclic stick, and a fourth sensor configured to detect a position of a pedal.

5. The rotorcraft of claim 1, wherein the primary microprocessor has a first architecture and the secondary microprocessor has a second architecture different than the first architecture.

6. The rotorcraft of claim 1, further comprising a trim actuator device and wherein the trim actuator device is configured to adjust a flight trim characteristic of the rotorcraft in response to the FCC entering the first desired control law state.

7. The rotorcraft of claim 1, wherein the rotorcraft has four pilot input axes, the four pilot input axes including the state of a collective lever pilot input device, the state of a cyclic stick pilot input device in a longitudinal direction, the state of the cyclic stick pilot input device in a latitudinal direction, and the state of a pedal pilot input device, and further wherein:
   the primary microprocessor is configured to receive input data including data from four position sensors corresponding respectively to the four pilot input axes and from flight condition sensors and determine therefrom a first desired control law state for each of the four pilot input axes;
   the secondary microprocessor is configured to receive the same input data as the primary microprocessor receives and determine therefrom a second desired control law state for each of the four pilot input axes; and
   the FCC is configured to compare the first desired control law state and the second desired control law state for each respective pilot input axis.

8. The rotorcraft of claim 7, wherein the FCC is configured to (a) enter the first desired control law state for a first pilot input axis when the first desired control law state and the second desired control law state match for the first pilot input axis, and (b) maintain a last known control law state for a second pilot input axis when the first desired control law state and the second desired control law state do not match for a second pilot input axis.

9. A method of flying a rotorcraft, the method comprising:
sensing a pilot input condition;
sensing a flight condition of the rotorcraft;
inputting the pilot input condition and the flight condition to a first hardware/software combination;
determining, using the first hardware/software combination, a first control law state based on the pilot input condition and the flight condition;
inputting the pilot input condition and the flight condition to a second hardware/software combination;
determining, using the second hardware/software combination, a second control law state;
comparing the first control law state and the second control law state;
adopting the first control law state, in response to determining that the first control law state and the second control law state match;
maintaining the first control law state, in response to determining that the first control law state and the second control law state match, when the first control law state is the same as an immediately previously adopted control law state; and
maintaining a previous control law state and maintaining a current flight trim condition in response to determining the first control law state and the second control law state do not match.

10. The method of claim 9, wherein sensing a pilot input condition comprises measuring one or more of a position of a collective lever, a position of a cyclic stick in a first direction, a position of the cyclic stick in a second direction, and a position of a pedal.

11. The method of claim 10, further comprising determining, using the first hardware/software combination, a first control law state for each measured pilot input condition.

12. The method of claim 11, further comprising adjusting a manner in which the rotorcraft responds to pilot input in response to adopting the first control law state.

13. The method of claim 9, wherein sensing a flight condition of the rotorcraft comprises measuring one or more of ground speed, air speed, yaw attitude, pitch attitude, roll attitude, altitude, wind speed, wind direction, and a current trim condition.

14. The method of claim 9, wherein the first hardware/software combination includes a first microprocessor running a first compiler and the second hardware/software combination includes a separate microprocessor.

15. The method of claim 9, wherein the first hardware/software combination includes a first microprocessor running a first compiler and the second hardware/software combination includes a separate microprocessor running a second compiler different than the first compiler.

16. The method of claim 9, wherein the first control law state and the second control law state is represented by a value selected from an integer, a true/false state, and a Boolean value.

17. The method of claim 9, wherein adopting the first control law state includes adjusting one or more flight trim conditions selected from the group consisting of main rotor speed, main rotor orientation, tail rotor speed, and tail rotor orientation.

18. A computer architecture for controlling a system, the computer architecture, including:
   a first processing lane, the first processing lane including a first microprocessor and a second microprocessor, wherein the first microprocessor and the second microprocessor have at least one material difference, which at least one material difference may cause, in the absence of an error, a different output from the second microprocessor relative to the output from the first microprocessor when the second microprocessor and the first microprocessor receive identical input data and run identical program steps on the identical input data;
   input ports configured to receive input data indicative of a condition of the system;
   a second processing lane, the second processing lane including a third microprocessor and a fourth microprocessor, wherein the third microprocessor and the fourth microprocessor are similar in all material respects, such that, absent an error, the fourth microprocessor and the third microprocessor will output a same result when the fourth microprocessor and the third microprocessor receive identical input data and run identical program steps on the identical data;
   a comparator configured to compare an output from the first microprocessor and the second microprocessor; and
   a state selector configured to select or maintain a state represented by the output from the first microprocessor when the output from the first microprocessor and the second microprocessor match and to maintain a current state when the output from the first microprocessor and the second microprocessor do not match.

19. The computer architecture for controlling a system of claim 18, further comprising:
   a processing lane selector configured to identify when a predetermined error condition has arisen and in response thereto to disable subsequent responses to the first processing lane to enable responses to the second processing lane.

20. The computer architecture for controlling a system of claim 18, wherein the at least one material difference is a difference selected from the group consisting of the first microprocessor running a different compiler than the second microprocessor, the first microprocessor having a different microprocessor architecture than the second microprocessor, the first microprocessor being manufactured by a different manufacturer than the second microprocessor, and combinations thereof.

21. The computer architecture for controlling a system of claim 18, wherein the system is a rotorcraft, and wherein the input data indicative of a condition of the system includes data selected from the group consisting of a position of a collective lever, a position of a cyclic stick in a first direction, a position of the cyclic stick in a second direction, a position of a pedal, ground speed, air speed, yaw attitude, pitch attitude, roll attitude, altitude, wind speed, wind direction, a current trim condition, and combinations thereof.

22. The computer architecture for controlling a system of claim 18, wherein the comparator comprises program instructions running on the first microprocessor.

23. The computer architecture for controlling a system of claim 18, wherein the system is a rotorcraft, and the state selector is configured to select a control law state whereby trim characteristics of the rotorcraft are adjusted or maintained depending upon the selected control law state.

24. The computer architecture for controlling a system of claim 18, wherein the state selector comprises program instructions running on the first microprocessor.

* * * * *